United States Patent
Cox

[11] 3,724,927
[45] Apr. 3, 1973

[54] OPTICAL ZOOM AND IMAGE-ROTATING SYSTEM

[75] Inventor: Arthur Cox, Park Ridge, Ill.

[73] Assignee: Bell & Howell Company, Chicago, Ill.

[22] Filed: Mar. 30, 1971

[21] Appl. No.: 129,618

Related U.S. Application Data

[62] Division of Ser. No. 750,612, Aug. 6, 1968, Pat. No. 3,582,203

[52] U.S. Cl. ..................350/203, 350/204, 350/207, 350/286
[51] Int. Cl. ............................................G02b 17/08
[58] Field of Search....350/203, 22, 23, 51, 286, 287, 350/232

[56] References Cited
UNITED STATES PATENTS

| | | | |
|---|---|---|---|
| 3,348,902 | 10/1967 | Dakin | 350/232 |
| 3,482,901 | 12/1969 | Melech | 350/203 |
| 3,497,289 | 2/1970 | Oberheuser | 350/203 X |
| 2,896,498 | 7/1959 | Brandon | 350/23 X |

*Primary Examiner*—John K. Corbin
*Attorney*—Jack H. Hall et al.

[57] ABSTRACT

Optical systems for microfilm readers or the like having image rotation capabilities and zoom lens means for selectively varying the image magnification. The optical systems include an aperture stop positioned remote from the microfilm and substantially adjacent the projection screen for maintaining constant screen brightness through a broad range of magnification.

2 Claims, 13 Drawing Figures

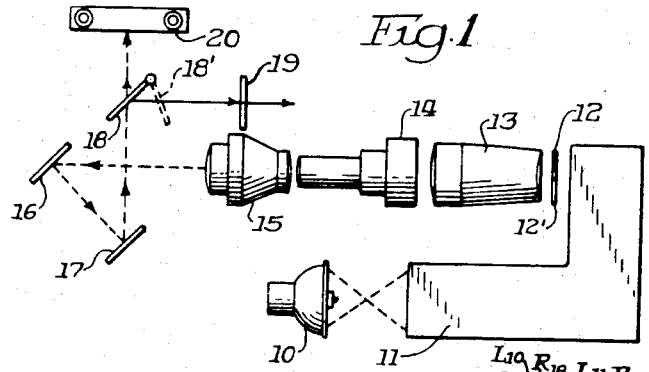
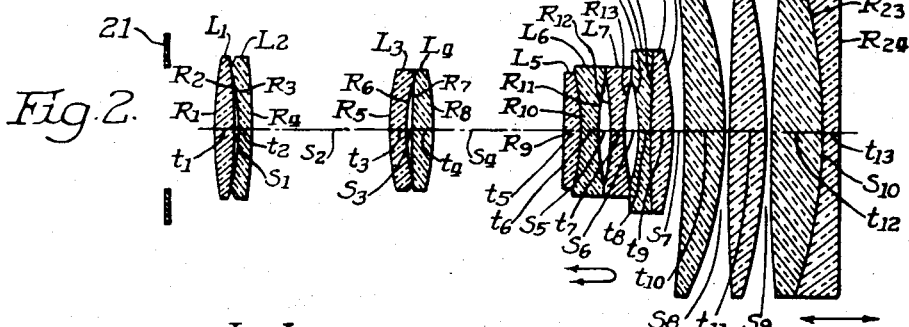
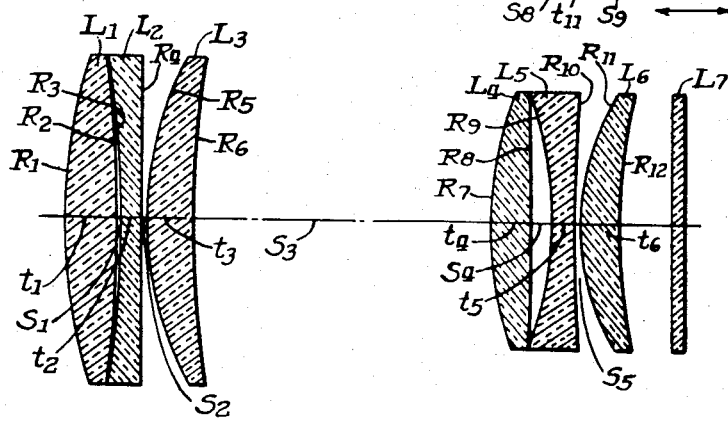
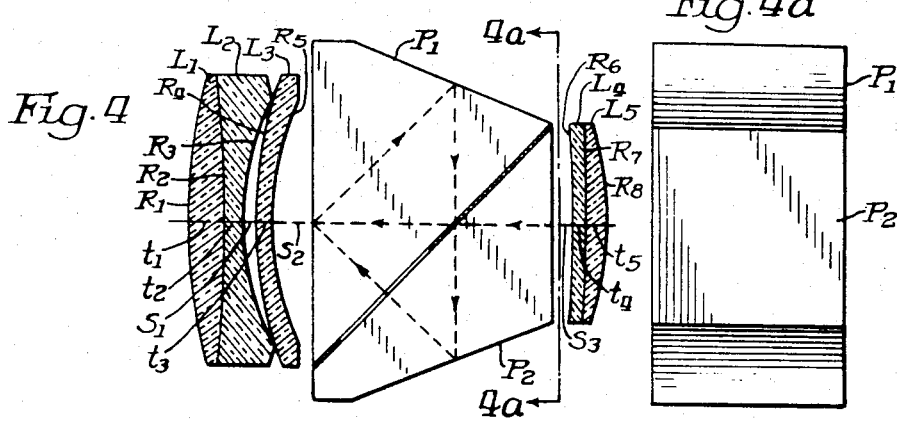

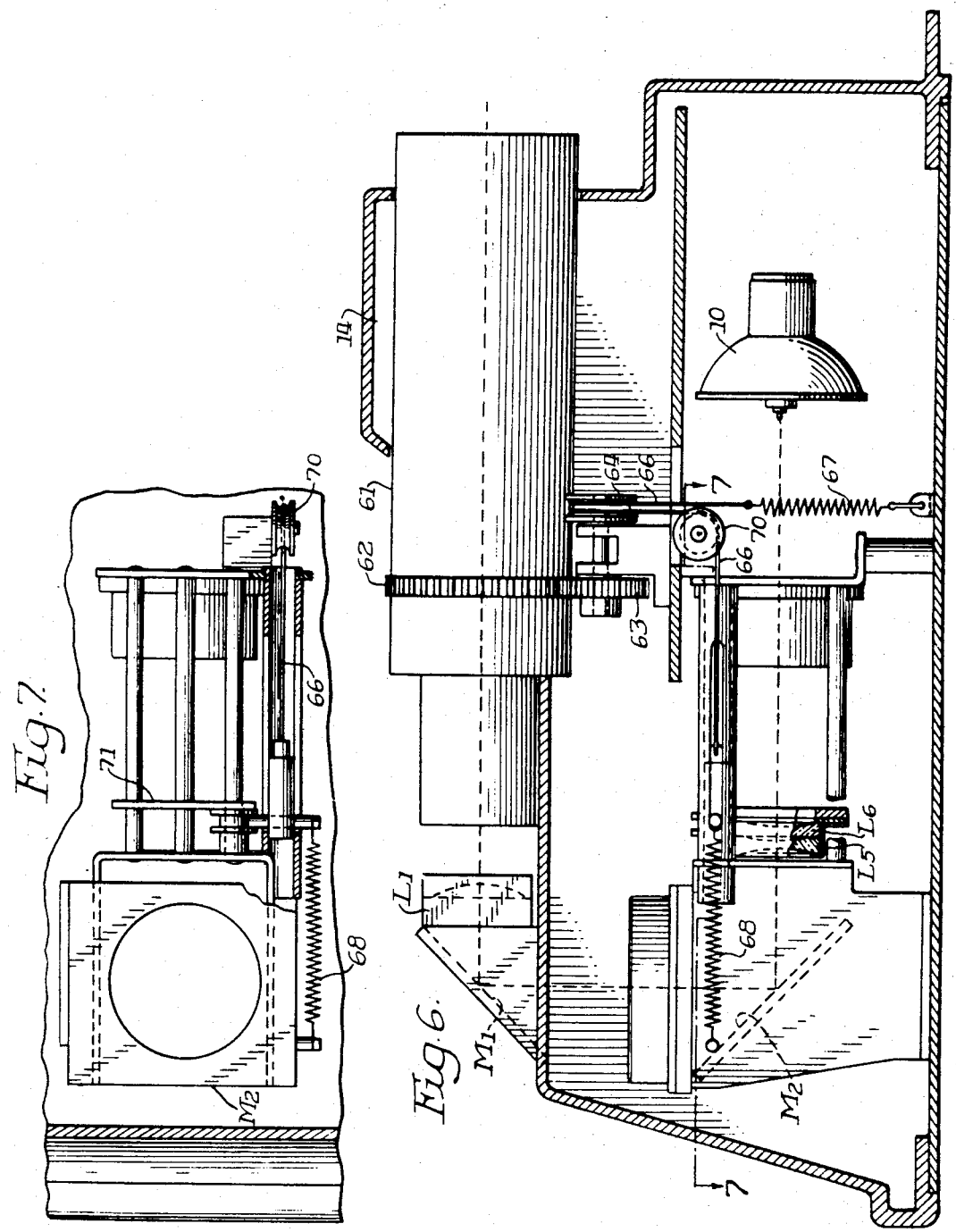

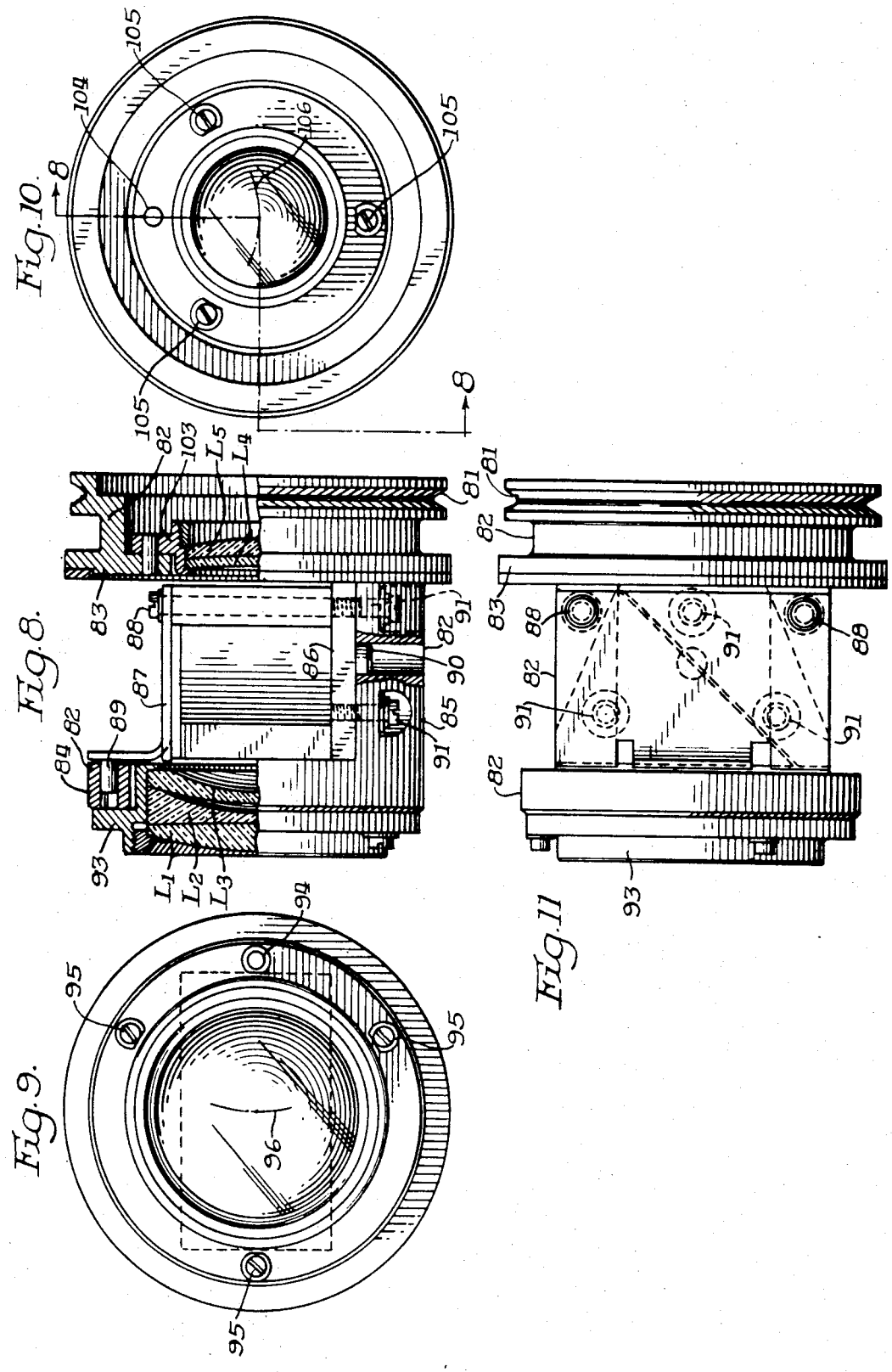

OPTICAL ZOOM AND IMAGE-ROTATING SYSTEM

This is a division of application Ser. No. 750,612, filed Aug. 6, 1968 now U.S. Pat. No. 3,582,203. This invention relates to optical systems for projection-type microfilm readers.

The principal object of the invention is to provide an improved cabinet-projector type microfilm reader having prism means for projecting the image of each frame in an upright position even though two frames on the microfilm are differently oriented, and having zoom lens means for varying the magnification at will through a 1.3-to-1 range or more.

Further objects will be pointed out with reference to the accompanying drawings, in which:

FIG. 1 is a schematic or block diagram of an optical system according to the invention.

FIG. 2 is a diagrammatic cross section of a zoom lens according to the invention.

FIG. 3 is a diagrammatic cross section of a prime lens according to the invention, particularly designed with its aperture stop in front of the lens for use with a zoom projector.

FIG. 4 is a diagrammatic cross section of a combined image rotator and angle spreader according to the invention, which is useful with any projector within its limits of aperture and field angle.

FIG. 4A is an elevational view of the image rotator shown in FIG. 4, as viewed from the right end thereof.

FIGS. 6 and 7 show a mechanism for varying the condenser for maintaining optimum illumination.

FIGS. 8 to 11 show an adjustable mount for the angle spreader lenses and the prism enclosed therebetween.

Figure 5:
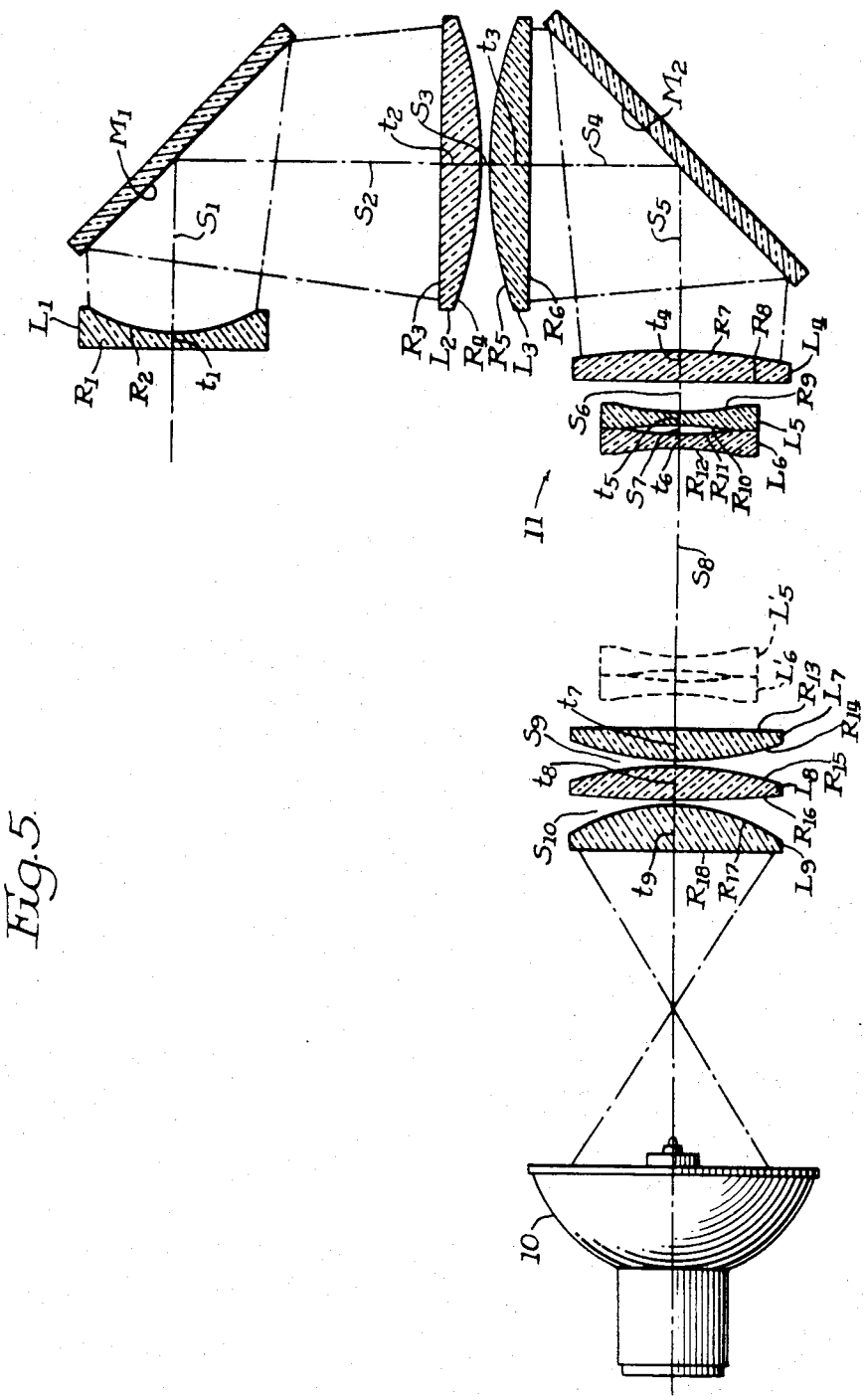
FIG. 5 is a diagrammatic cross section of a zoom condenser system according to the invention and of the sealed-reflector lamp with which it was particularly designed to be used.

It is a further object of the invention to provide an optical system for a microfilm projector as outlined in FIG. 1 consisting of a lamp 10, a zoom condenser system 11, a film gate 12, a prime lens 13 for projecting an image of film 12' placed in the film gate, a zoom lens 14 for varying the magnification at the option of the user, a combined image rotator and angle spreader 15, a system of mirrors 16, 17, 18 (shown in much reduced scale) for folding the path of the projected beam, a fine grain projection screen 19 and means for automatically adjusting the condenser for optimum illumination when the zoom lens is adjusted for changing magnification.

A further object of the invention is to provide an improved zoom lens, as shown in FIG. 2, characterized in part by having its aperture stop outside the zoom lens toward the long-conjugate end of the system whereby the brightness of the projected image remains constant, provided the incident light fills the aperture.

A further object of the invention is to provide an improved prime lens as shown in FIG. 3, having general utility in projectors requiring the aperture stop to be at a distance in front of the body of the lens, and which is particularly useful in combination with the zoom lens of FIG. 2.

A further object of the invention is to provide a combined angle spreader or wide angle attachment and image-rotating prism, as shown in FIG. 4, whereby image rotation can be accomplished throughout a wider angular field than the intrinsic angular limits of the prism.

An object of a particular feature of the invention is to provide an image-rotation prism having the aperture stop for the system near the optical center of the prism.

An object of a further feature of the invention is to provide a rotatable mount for the angle spreader and prism, as shown in FIGS. 8, 9, 10 and 11 which is inexpensive to manufacture and easy to adjust for proper alignment of the prism and lens elements with each other and with the axis of rotation.

FIG. 1 is a block diagram of an illumination and optical system for a microfilm reader or the like, according to the invention. An incandescent lamp 10 and condenser 11 (see FIG. 5) illuminate a film gate 12 of known construction. For clarity of description the microfilm copy 12' of printed matter is placed in the film gate for projection. A projection lens or prime lens 13 (see FIG. 3) forms either a real or a virtual image of the microfilm. A zoom lens 14 (see FIG. 2) in turn forms an image which may be varied in size at the option of the user. The zoom control is of known construction having a helical groove and a specially shaped slot, both formed in a rotatable lens tube.

Forwardly of the zoom lens is a combined angle spreader and image rotator 15 (see FIGS. 4 and 4A) which receives light rays from the zoom lens and projects an enlarged image which may be rotated by the user so that the printed matter is right side up. The rays projected from the angle spreader are reflected in three plane mirrors 16, 17 and 18 which fold the optical path for compactness. The image is finally formed on a projection screen 19 for viewing from the front.

Mirror 18 is mounted on a hinge and may be pivoted to position 18' thereby allowing the image to be formed on a platen 20 normally supplied with photo-sensitive paper for making a photo-copy reproduction of the printed matter.

The optical system has been designed to correct for spherical aberration, comma, astigmatism, distortion, lateral color, and combined variations of these aberrations, over the whole of the projection screen for all positions of the zoom control. The combination of angle spreader and Pechan prism is particularly favorable to the establishment of such an aberrational correction.

Each known prism type has its characteristic limiting angle of field, and outside this angle no useful light (or too little light) passes through. By combining the Pechan prism with an angle spreader, a wider angular field is projected than could otherwise be projected through this type of prism. The Dove prism may have a wider limiting angle of field but must be used with substantially collimated light. The present invention combines the wider field angle with the additional advantages derived from the entry and exit faces' of the prism being perpendicular to the optical axis.

FIG. 2 shows a zoom lens according to the invention adapted to operate with an aperture stop 21 forwardly thereof. When assembled as part of the complete system, a stop is provided either adjacent to or within the image rotator (FIG. 4). The zoom lens consists of a front stationary member $L_1$ to $L_4$, a zooming member $L_5$ to $L_8$ of negative power and a compensation member $L_{10}$ to $L_{13}$, all mounted in known manner for moving the zooming member in one direction for changing the magnification and moving the compensation member first one direction and then in the other direction for maintaining the image position. The radii of curvature $R_1$ to $R_{24}$, the thicknesses $t_1$ to $t_{13}$ of the lens elements, the spacing between certain lens elements $s_1$ to $s_{10}$, the refractive indices $n$ for the D line of the spectrum and the Abbe dispersion numbers V are as listed in Table I. The + and − signs indicate curvature convex and concave to the front, respectively. Dimensions are in inches but of course may be scaled to a larger or smaller size.

TABLE I

| | | | | |
|---|---|---|---|---|
| $L_1$ | $R_1$=+1.667 | | | |
| | $R_2$=−2.857 | $t_1$=.095 | $n$=1.511 | V=60.5 |
| | | $s_1$=.010 | | |
| $L_2$ | $R_3$=−1.818 | $t_2$=.070 | $n$=1.805 | V=25.5 |
| | $R_4$=−3.455 | $s_2$=.730 | | |
| $L_3$ | $R_5$=+1.361 | $t_3$=.070 | $n$=1.805 | V=25.5 |
| | $R_6$=+.965 | $s_3$=.036 | | |
| $L_4$ | $R_7$=+5.236 | $t_4$=.090 | $n$=1.548 | V=45.9 |
| | $R_8$=−1.627 | | | |
| | | $s_4$=(.681 W.A. / .448 M. / .035 T.P.) | | |
| $L_5$ | $R_9$=−16.67 | $t_5$=.080 | $n$=1.805 | V=25.5 |
| $L_6$ | $R_{10}$=−1.295 | $t_6$=.075 | $n$=1.697 | V=55.6 |
| | $R_{11}$=+1.130 | $s_5$=.075 | | |
| $L_7$ | $R_{12}$=−1.110 | $t_7$=.070 | $n$=1.697 | V=55.6 |
| | $R_{13}$=+2.247 | $s_6$=.075 | | |
| $L_8$ | $R_{14}$=−.833 | $t_8$=.070 | $n$=1.697 | V=55.6 |
| $L_9$ | $R_{15}$=+6.993 | $t_9$=.110 | $n$=1.805 | V=25.5 |
| | $R_{16}$=−1.509 | | | |
| | | $s_7$=(.0621 W.A. / .518 M. / .775 T.P.) | | |
| $L_{10}$ | $R_{17}$=−7.077 | $t_{10}$=.200 | $n$=1.517 | V=64.2 |
| | $R_{18}$=−2.008 | $s_8$=.005 | | |
| $L_{11}$ | $R_{19}$=+20.00 | $t_{11}$=.200 | $n$=1.620 | V=60.3 |
| | $R_{20}$=−2.817 | $s_9$=.005 | | |
| $L_{12}$ | $R_{21}$=+5.750 | $t_{12}$=.275 | $n$=1.620 | V=60.3 |
| | $R_{22}$=−2.538 | $s_{10}$=.008 | | |
| $L_{13}$ | $R_{23}$=−2.439 | $t_{13}$=.090 | $n$=1.805 | V=25.5 |
| | $R_{24}$=−138.1 | | | |

FIG. 3 shows the prime lens and Table II gives the lens data in the same manner as Table I. The flat plate $L_7$ forms a part of the film gate.

TABLE II

| | | | | |
|---|---|---|---|---|
| $L_1$ | $R_1$=+3.333 | $t_1$=.275 | $n$=1.620 | V=60.3 |
| | $R_2$=−3.774 | $s_1$=.0065 | | |
| $L_2$ | $R_3$=−3.509 | $t_2$=.100 | $n$=1.805 | V=25.5 |
| | $R_4$=+125.0 | $s_2$=.005 | | |
| $L_3$ | $R_5$=+1.724 | $t_3$=.220 | $n$=1.620 | V=60.3 |
| | $R_6$=+5.464 | $s_3$=1.550 | | |
| $L_4$ | $R_7$=+1.493 | $t_4$=.200 | $n$=1.518 | V=59.0 |
| | $R_8$=−20.00 | | | |
| $L_5$ | $R_9$=−1.818 | $s_4$=.115 | | |
| | $R_{10}$=+14.93 | $t_5$=.100 | $n$=1.805 | V=25.5 |
| | $R_{11}$=+1.250 | $s_5$=.005 | | |
| $L_6$ | $R_{12}$=+2.966 | $t_6$=.200 | $n$=1.526 | V=51.0 |

FIG. 4 shows the combined angle spreader and image rotator in axial section and FIG. 4A shows the prism $P_1+P_2$ in elevation. The image rotating prism and its principle of operation are well known and are fully described in various well-known optics books. An odd number of reflections are required (five in this case) and the axial ray emerges along the identical straight line along which it entered. Two reflections take place by total internal reflection at a pair of closely spaced internal surfaces which are traversed by the beam between these two reflections. It is believed to be novel to insert a thin sheet of opaque material between these surfaces as indicated by a section line in FIG. 4. The sheet of opaque material is provided with an opening (normally round) which functions as the aperture stop of the system. It should be noted that an aperture stop in this position (about midway between the two members) is favorable for uniform illumination of the projected image while retaining a prism of compact physical size.

Alternatively, using a similar Pechan prism, the sheet of opaque material may be eliminated and the internal diagonal surfaces aluminized except for an aperture stop formed by a circularly shaped, non-aluminized, clear area through which the reflected rays may pass without restriction..

The angle spreader includes five lens elements $L_1$ to $L_5$ and is especially designed for correction of the image aberrations in conjunction with the prism between the two members. Constructional data for this lens is given in Table III in the same manner as above.

TABLE III

| | | | | |
|---|---|---|---|---|
| $L_1$ | $R_1$=+2.765 | $t_1$=.180 | $n$=1.717 | V=29.5 |
| | $R_2$=−8.33 | | | |
| $L_2$ | $R_3$=+1.429 | $t_2$=.080 | $n$=1.575 | V=41.3 |
| | $R_4$=+2.500 | $s_1$=.065 | | |
| $L_3$ | $R_5$=+1.429 | $t_3$=.080 | $n$=1.575 | V=41.3 |
| | | $s_2$=.210 | | |
| $P_1$ & $P_2$ | | $t_p$=4.621 | $n$=1.697 | V=55.6 |
| | | $s_3$=.100 | | |
| | | $s_3$=.100 | | |
| $L_4$ | $R_6$=−4.545 | $t_4$=.065 | $n$=1.648 | V=33.9 |
| | $R_7$=−23.530 | | | |
| $L_5$ | $R_8$=−1.961 | $t_5$=.100 | $n$=1.572 | V=57.5 |

FIGS. 8, 9, 10 and 11 are views of the novel mount for the image rotator and angle spreader. A pulley-like ring 81 is rotatably gripped by a mating bearing (not shown) on the cabinet. The bearing, of course, is made in at least two pieces for inserting the pulley. The body 82 of the prism mount may be formed integral with the pulley and consists of two rings 83 and 84 rigidly connected by a horizontal bar 85. The bar 85 is flat on the face toward the axis of rotation for receiving a lower plate 86 of a prism clamp assembly, which in turn is held to an upper plate 87 by screws 88 for clamping the prism. The prism unit is held against bar 85 by a tongue and pin 89 inserted in the front ring 84. This pin has sufficient play for rotatably adjusting the prism about pin 90 by engaging a hole in bar 85 until it is finally firmly held by screws 91.

A front lens mount 93 is held against the front ring 84 by three screws 95 which pass through oversized holes in the lens mount. Before these screws are tightened, the mount is adjusted by rotation about pin 94 engaging a hole (not shown) in ring 84 so that the axis of the lenses $L_1$ to $L_3$ is adjustable in a substantially vertical direction along the central portion of a circular arc 96.

The rear lens mount 103 is mounted against the rear ring 83 for adjustment of its axis in a horizontal direction along arc 106 by slight rotation around pin 104 in exactly the same manner before screws 105 are finally tightened.

Directions for alignment during manufacture are as follows:

1. Line up a collimator and an auto-collimator and then insert the image rotator with lens 1–5 of FIG. 4. temporarily removed.

2. Mount a plane parallel mirror on the rear face of the pulley 81 and adjust the entire unit so that this mirror is perpendicular to the auto-collimator axis.

3. Remove the plane mirror and adjust the Pechan prism about pivot 90 so that the collimator image lies as close as possible to its original position in the auto-collimator and tighten screws 91.

4. Insert lenses 1–5 of FIG. 4, adjust the front and rear cells about pins 94 and 104 so that all coma is removed from one collimator image and tighten screws 95 and 105.

5. Screws 91, 95 and 105 may be fixed with cement to prevent later disassembly by the customer who may not be equipped to realign the parts.

FIG. 5 is an optical diagram of the condenser system including a 150 watt projection lamp 10 with sealed-in reflector. Mirrors $M_1$ and $M_2$ allow the condenser system to be folded into a small cabinet. One member, consisting of two lenses $L_5$ and $L_6$, is movable for maintaining optimum illumination during zooming. The mechanism for moving these lenses is described below with reference to FIGS. 6 and 7.

The constructional data for the condenser system is given in Table IV. The + radii are convex to the front, but because of the folding of the system the front is sometimes to the left and sometimes to the right. The consistent rule is that the right from the lamp enters each lens from the rear and leaves it through the front surface.

TABLE IV

| | | | | |
|---|---|---|---|---|
| $L_1$ | $R_1=\infty$ | $t_1=.100$ | $n=1.611$ | $V=58.8$ |
| | $R_2=+1.210$ | $s_1=1.275$ | | |
| | $M_1$ (45°) | $s_2=1.975$ | | |
| $L_2$ | $R_3=\infty$ | $t_2=.300$ | $n=1.523$ | $V=58.6$ |
| | $R_4=-3.000$ | $s_3=.050$ | | |
| $L_3$ | $R_5=+3.000$ | $t_3=.300$ | $n=1.523$ | $V=58.6$ |
| | $R_6=\infty$ | $s_4=1.125$ | | |
| | $M_2$ (45°) | $s_5=1.325$ | | |
| $L_4$ | $R_7=+4.540$ | $t_4=.240$ | $n=1.523$ | $V=58.6$ |
| | $R_8=\infty$ | $s_6=.207$ | | |
| | | $t_0=2.007$ | | |
| $L_5$ | $R_9=-3.080$ | $t_5=.100$ | $n=1.523$ | $V=58.6$ |
| | $R_{10}=+3.080$ | $s_7=.082$ | | |
| $L_6$ | $R_{11}=-3.080$ | $t_6=.100$ | $n=1.523$ | $V=58.6$ |
| | $R_{12}=+3.080$ | $s_8=2.047$ | | |
| | | $t_0=.247$ | | |
| $L_7$ | $R_{13}=\infty$ | $t_7=.225$ | $n=1.523$ | $V=58.6$ |
| | $R_{14}=-2.250$ | $s_9=.030$ | | |
| $L_8$ | $R_{15}=+2.250$ | $t_8=.240$ | $n=1.611$ | $V=58.8$ |
| | $R_{16}=-9.100$ | $s_{10}=.030$ | | |
| $L_9$ | $R_{17}=+1.330$ | $t_9=.350$ | $n=1.611$ | $V=58.8$ |
| | $R_{18}=\infty$ | | | |

FIGS. 6 and 7 show the mechanism for moving the condenser lens elements $L_5$, $L_6$ under the control of the zoom lens 14. The sleeve 61 of the zoom lens is turned for zooming in the manner well known for mechanical compensation systems. This sleeve is provided with a toothed ring 62 which engages a pinion 63 mounted with a friction pulley 64 on an auxiliary shaft. A flexible cable 66 is wrapped around the pulley 64 a sufficient number of times (about three) to prevent slippage, and is kept under tension by coil springs 67, 68. This cable passes over an idler pulley 70 and is attached to a sliding carriage 71 on which are mounted the lens elements $L_5$ and $L_6$ for movement according to the invention. The angular movement of the sleeve 61, the gear ratio of the ring 62 to the pinion 63 and the diameter of the friction pulley 64 are designed in a well-known manner to produce a movement of about 1.8 inches.

Figure 12:
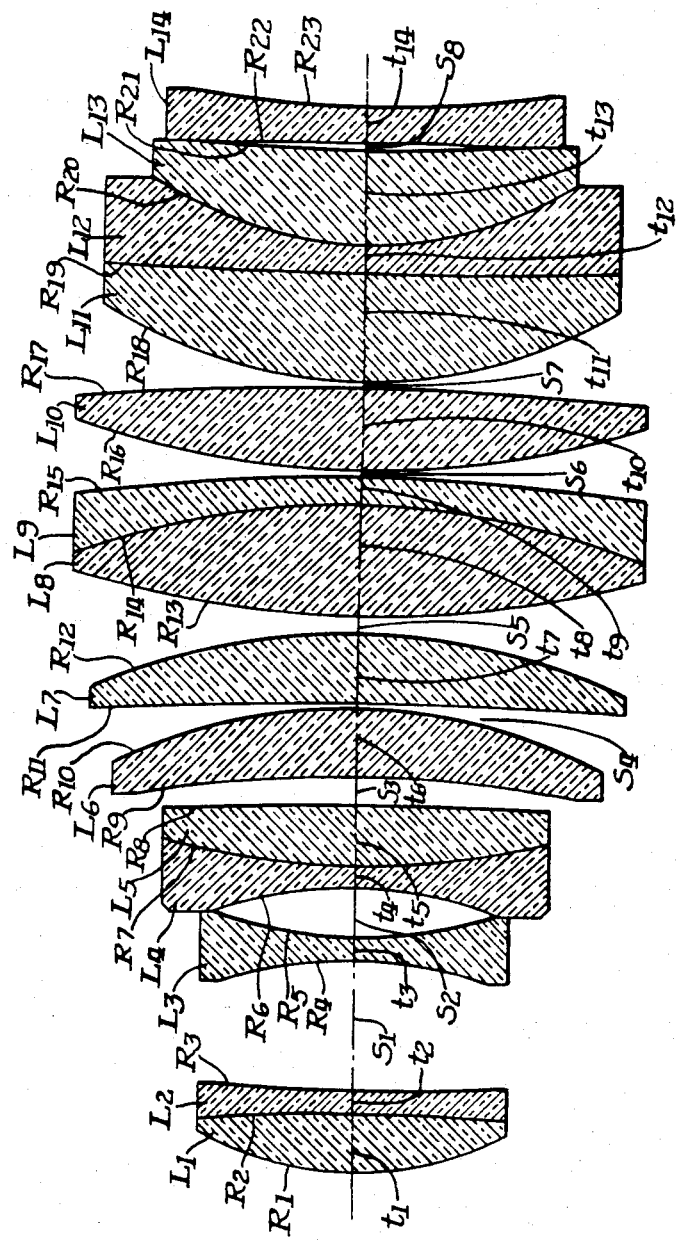
FIG. 12 shows another form of zoom lens with which the angle spreader is adapted to be used.

FIG. 12 shows another zoom lens and prime lens system with which the angle spreader and image rotator is adapted to be used. The constructional data for this system are given in Table V and it should be noted that 1.805/25.5 glass, which is available with the usual yellow color almost removed, should be utilized.

TABLE V

| | | | | |
|---|---|---|---|---|
| $L_1$ | $R_1=+1.196$ | $t_1=.220$ | $n=1.640$ | $V=60.2$ |
| $L_2$ | $R_2=-6.757$ | $t_2=.080$ | $n=1.805$ | $V=25.5$ |
| | $R_3=+20.830$ | $s_1=(.4695$ | | |
| | | $s_1=(.2550$ | | |
| $L_3$ | $R_4=-1.610$ | $t_3=.080$ | $n=1.697$ | $V=55.6$ |
| | $R_5=+1.610$ | $s_2=.1820$ | | |
| $L_4$ | $R_6=-1.395$ | $t_4=.080$ | $n=1.697$ | $V=55.6$ |
| | $R_7=+2.793$ | | | |
| $L_5$ | $R_8=-16.13$ | $t_5=.230$ | $n=1.805$ | $V=25.5$ |
| | | $s_3=(.1040$ | | |
| | | $s_3=(.3185$ | | |
| $L_6$ | $R_9=-4.651$ | $t_6=.250$ | $n=1.640$ | $V=60.2$ |
| | $R_{10}=-1.942$ | $s_4=.005$ | | |
| $L_7$ | $R_{11}=-14.29$ | $t_7=.250$ | $n=1.640$ | $V=60.2$ |
| | $R_{12}=-2.301$ | $s_5=.060$ | | |
| $L_8$ | $R_{13}=+4.000$ | $t_8=.400$ | $n=1.640$ | $V=60.2$ |
| $L_9$ | $R_{14}=-2.857$ | $t_9=.100$ | $n=1.805$ | $V=25.5$ |
| | $R_{15}=-8.000$ | $s_6=.005$ | | |
| $L_{10}$ | $R_{16}=+3.077$ | $t_{10}=.310$ | $n=1.640$ | $V=60.2$ |
| | $R_{17}=-10.000$ | $s_7=.005$ | | |
| $L_{11}$ | $R_{18}=+1.786$ | $t_{11}=.400$ | $n=1.640$ | $V=60.2$ |
| $L_{12}$ | $R_{19}=+50.000$ | $t_{12}=.100$ | $n=1.805$ | $V=25.5$ |
| $L_{13}$ | $R_{20}=+1.493$ | $t_{13}=.340$ | $n=1.640$ | $V=60.2$ |

$L_{14}$
$R_{21}=+9.524$
$R_{22}=+200.0$
$R_{23}=+4.358$
$s_6=.0235$
$t_{14}=.130$   $n=1.805$  $V=25.5$
BF $=.743$

It is obvious that upon study by those skilled in the art the disclosed invention may be altered or modified both in physical appearance and construction without departing from its inventive concept. Therefore, the scope of protection to be given this invention should not be limited by the embodiments described above, but should be determined by the essential descriptions thereof which appear in the appended claims.

The embodiments of the invention in which an exclusive property or privilege is claimed are defined as follows:

1. A supplementary wide angle lens and image rotator comprising a front negative lens member concave to the rear, a rear positive lens member spaced therefrom, and a Pechan type image reversing prism as hereinbefore defined between said two members, all rotatably mounted in optical axial alignment, the axis of rotation coinciding with the external segments of the optical axis, said prism having a pair of closely spaced internal faces adapted to transmit the optical beam in a direction substantially perpendicular thereto, said internal faces each having a reflective coating thereon; said reflective coatings defining aligned uncoated areas providing an aperture stop substantially midway between the two lens members.

2. A wide-angle lens attachment comprising a front negative member and a rear positive member spaced therefrom and adapted to enclose an optical prism therebetween, which said two members are made up of five lens elements $L_1$ to $L_5$ substantially complying with the following table in which dimensions are relative in terms of a unit which may conveniently be an inch and in which $R_1$ to $R_8$ designate the respective radii of curvature of the lens surfaces, $t_1$ to $t_5$ the axial thicknesses, $s_1$ to $s_3$ the axial separations, n the refractive indices for the D line of the spectrum and V the Abbe dispersion numbers:

| | | | | |
|---|---|---|---|---|
| $L_1$ | $R_1=+2.765$ | $t_1=.180$ | $n=1.717$ | $V=29.5$ |
| $L_2$ | $R_2=-8.333$ $R_3=+1.429$ | $t_2=.080$ | $n=1.575$ | $V=41.3$ |
| $L_3$ | $R_4=+2.500$ $R_5=+1.429$ | $t_3=.080$ | $n=1.575$ | $V=41.3$ |
| $P_1$ & $P_2$ | | $s_2=.210$ $t_p=4.621$ $s_3=.100$ | $n=1.697$ | $V=55.6$ |
| $L_4$ | $R_6=-4.545$ $R_7=-23.530$ | $t_4=.065$ | $n=1.648$ | $V=33.0$ |
| $L_5$ | $R_8=-1.961$ | $t_5=.100$ | $n=1.572$ | $V=57.5$ |

* * * * *